(12) United States Patent
Samler

(10) Patent No.: US 7,105,766 B2
(45) Date of Patent: Sep. 12, 2006

(54) WELDING TORCH HAVING REMOVABLE HANDLE AND METHOD OF OPERATING SAME

(75) Inventor: Gary R. Samler, Holmes Beach, FL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/244,707

(22) Filed: Sep. 16, 2002

(65) Prior Publication Data

US 2004/0050825 A1   Mar. 18, 2004

(51) Int. Cl.
B23K 9/00   (2006.01)

(52) U.S. Cl. ........................................................ 219/75

(58) Field of Classification Search ........... 219/137.31, 219/137.51, 137.52, 137.62, 137.63, 137.9, 219/138, 144, 75
See application file for complete search history.

(56) References Cited

U.S. PATENT DOCUMENTS

| | | | | |
|---|---|---|---|---|
| 3,703,622 A | * | 11/1972 | Kleppen, Jr. .................. | 219/75 |
| 4,145,595 A | * | 3/1979 | Keller et al. .................. | 219/75 |
| 4,403,136 A | * | 9/1983 | Colman ................ | 219/137.31 |
| 4,524,260 A | * | 6/1985 | Rotilio ........................ | 219/75 |
| 4,554,433 A | * | 11/1985 | Toothaker ............... | 219/137.63 |
| 4,864,099 A | * | 9/1989 | Cusick, III et al. ..... | 219/137.62 |
| 5,166,496 A | * | 11/1992 | Sarkissian ............... | 219/137.51 |
| 5,403,987 A | * | 4/1995 | Rehrig ........................ | 219/75 |
| 5,571,427 A | * | 11/1996 | Dimock et al. ............... | 219/75 |
| 5,595,671 A | * | 1/1997 | David .................... | 219/137.62 |
| 5,772,102 A | * | 6/1998 | New et al. ..................... | 228/42 |
| 6,078,023 A | * | 6/2000 | Jones et al. ............ | 219/137.63 |
| RE36,997 E | * | 12/2000 | Kensrue ................. | 219/137.31 |
| 6,534,747 B1 | * | 3/2003 | Rehrig ................... | 219/137.31 |
| 6,855,905 B1 | * | 2/2005 | Delgado et al. ............... | 219/74 |

* cited by examiner

Primary Examiner—Kevin P. Kerns
(74) Attorney, Agent, or Firm—Fletcher Yoder

(57) ABSTRACT

A welding torch having a torch body that is adapted to receive a welding electrode. A collet and collet body, or other mechanism, may be used to secure the electrode to the torch body. The welding torch has a handle that is securable to the torch body, but which may be selectively removed from the torch body. The welding torch may be operated with the handle removed. The welding torch is adapted to prevent arcing from the torch body to a surrounding surface when the handle is removed. The welding torch also may have a cable that is adapted to convey gas and electricity that is affixed to the torch body. The torch body may have an electrical connector disposed within the torch body for connection to the cable operable to convey gas and electricity. The cable and torch may also be adapted to provide cooling water to the torch body. The torch body may also be flexible.

35 Claims, 4 Drawing Sheets

WELDING TORCH HAVING REMOVABLE HANDLE AND METHOD OF OPERATING SAME

BACKGROUND OF THE INVENTION

The present invention relates generally to the field of arc welding systems, and more particularly to an arc welding torch that is adapted for operation with a removable handle.

TIG (Tungsten Inert Gas) welding (also known as gas tungsten arc welding, GTAW, or HELIARC) is a type of arc welding process in which an electric arc is maintained between a cylindrical metal electrode and a metal object. The heat generated by the arc produces localized melting of the metal object. The electrode, typically tungsten, is secured to a torch to enable a user to direct the electrode and establish the point of contact between the electrode and the object. TIG welding may be performed with or without the addition of a filler metal. Typically, the weld puddle and the area surrounding the weld puddle are protected from the atmosphere by an inert gas. The inert gas prevents rapid oxidation of the weld and the surrounding metal.

The electricity for the welding process is provided by a power source through a welding cable coupled to the torch. Typically, the power source is a constant voltage AC, DC, or a combination AC/DC source. In addition, a TIG welding cable typically is adapted to transport the inert gas to the torch. Furthermore, the TIG welding process typically generates a substantial amount of heat in the electrode. Consequently, cooling fluid may be used to cool the torch. Thus, a welding cable for a TIG welding system may transport electricity, gas, and cooling fluid.

A typical TIG welding torch has a torch body and a handle that is disposed onto the torch body. The welding cable from a power supply typically is connected to a connector on the torch body. The handle may be removed from the torch body to enable the welding cable to be connected to the torch body. However, the handle typically is long or otherwise bulky and limits the ability of a user to operate in tight areas. The handle may be removed from the welding torch to enable the torch to access a tighter area. However, if the handle is removed, conductive metal portions of the welding torch are exposed, such as the connectors used to connect the torch body to the welding cable, increasing the possibility of an arc being produced between the welding torch and an adjacent structure, or the user.

A need exists for a technique to enable a welding torch to be operated with and without a handle. More specifically, a need exists for a technique to enable a welding torch to be operated without a handle and without risk of electrical arcing from the portions of the welding torch that are exposed when the handle is removed.

SUMMARY OF THE INVENTION

The present technique may solve one or more of the needs outlined above. According to one aspect of the present technique, a welding torch is provided. The welding torch has a torch body that is adapted to receive a welding electrode. A collet and collet body may be used to secure the electrode to the torch body. The welding torch has a handle that is securable to the torch body, but which may be removed from the torch body. The welding torch may be operated with the handle removed. The welding torch is adapted to prevent arcing from the torch body to a surrounding surface when the handle is removed. The welding torch also may have a cable that is adapted to convey gas and electricity that is affixed to the torch body. The torch body may have an electrical connector disposed within the torch body for connection to the cable operable to convey gas and electricity. The cable and torch may also be adapted to provide cooling water to the torch body. The torch body may also be flexible.

According to another aspect of the present invention, a method of operating a welding torch is provided. The method may comprise operating a welding torch with its handle removed. The method also may comprise gripping the torch body of the welding torch to operate the welding torch after the handle is removed. The method also may comprise flexing the torch body to direct an electrode with a desired orientation.

BRIEF DESCRIPTION OF THE DRAWINGS

The foregoing and other advantages and features of the invention will become apparent upon reading the following detailed description and upon reference to the drawings in which.

DETAILED DESCRIPTION OF SPECIFIC EMBODIMENTS

Figure 1:
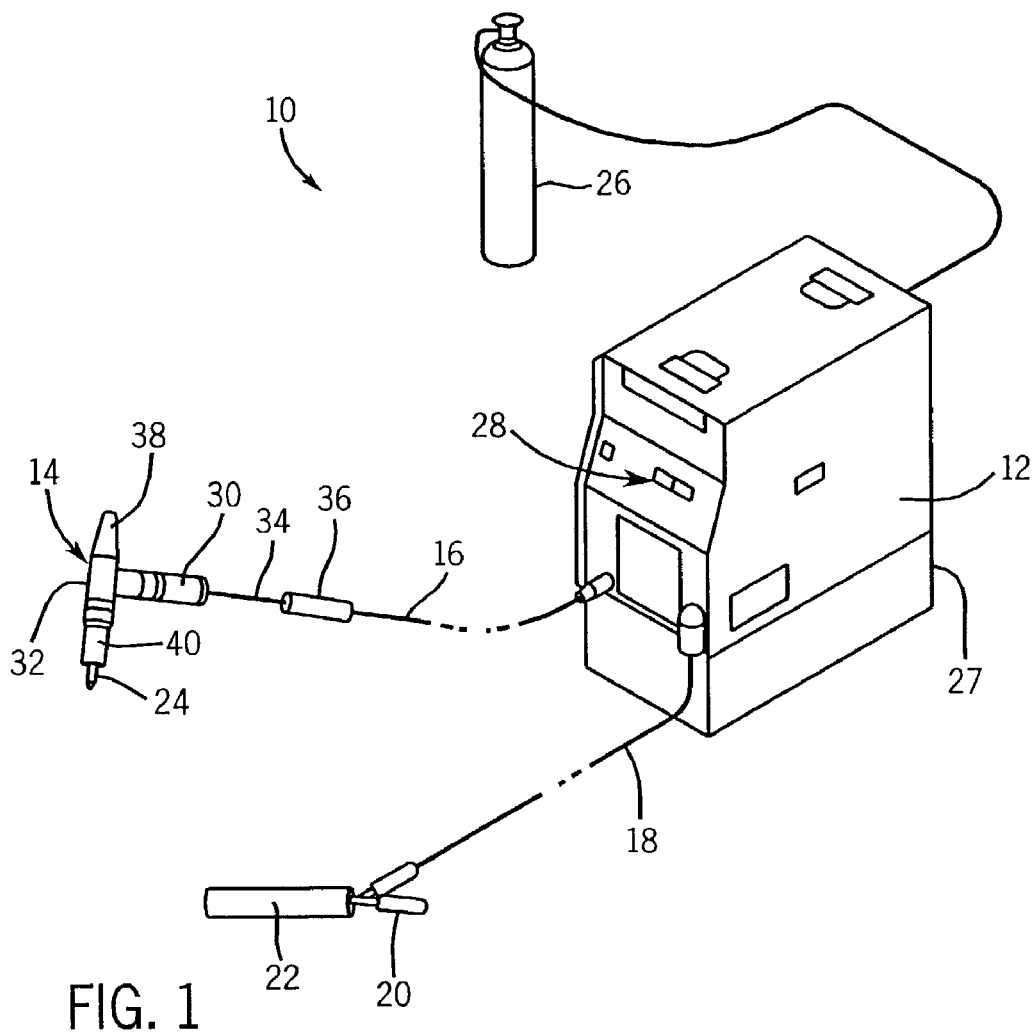
FIG. 1 is a perspective view of a TIG welding system, according to an exemplary embodiment of the present technique.

Referring generally to FIG. 1, a portable TIG welding system is illustrated, as represented generally by reference numeral 10. However, the techniques provided below may be used with other types of welding systems. The TIG welding system 10 comprises a power supply 12, a TIG welding torch 14, a welding cable 16, and a return cable 18. The power supply 12 may be a constant voltage AC, DC, a combination AC/DC source, or some other type of power supply. The welding cable 16 electrically couples the welding torch 14 to one terminal of the power supply 12. The return cable 18 is coupled to a second terminal of the power supply 12. In the illustrated embodiment, the return cable 18 has a clamp 20 that is adapted to secure and electrically couple the return cable 18 to a workpiece 22 to be welded. The welding torch 14 is adapted to receive an electrode 24. When the electrode 24 comes in close proximity to or touches the material 22 to be welded, an electric circuit is completed from one terminal of the power supply 12, through the welding cable 16, the electrode 24, the workpiece 22, the work clamp 20, and the return cable 18 to a second terminal of the power supply 12.

Gas from a gas cylinder 26 is coupled to the torch 14 through the power supply 12 and welding cable 16, in the illustrated embodiment. However, gas may be provided from a manifold of an installed gas supply. In addition, in this embodiment, the system 10 has a fluid cooler 27 that is adapted to provide a flow of cooling fluid for the welding torch 14. In this embodiment, the power supply 12 has numerous controls 28 to enable a user to control various operating parameters of the power supply 12, such as the output amperage.

Figure 2:
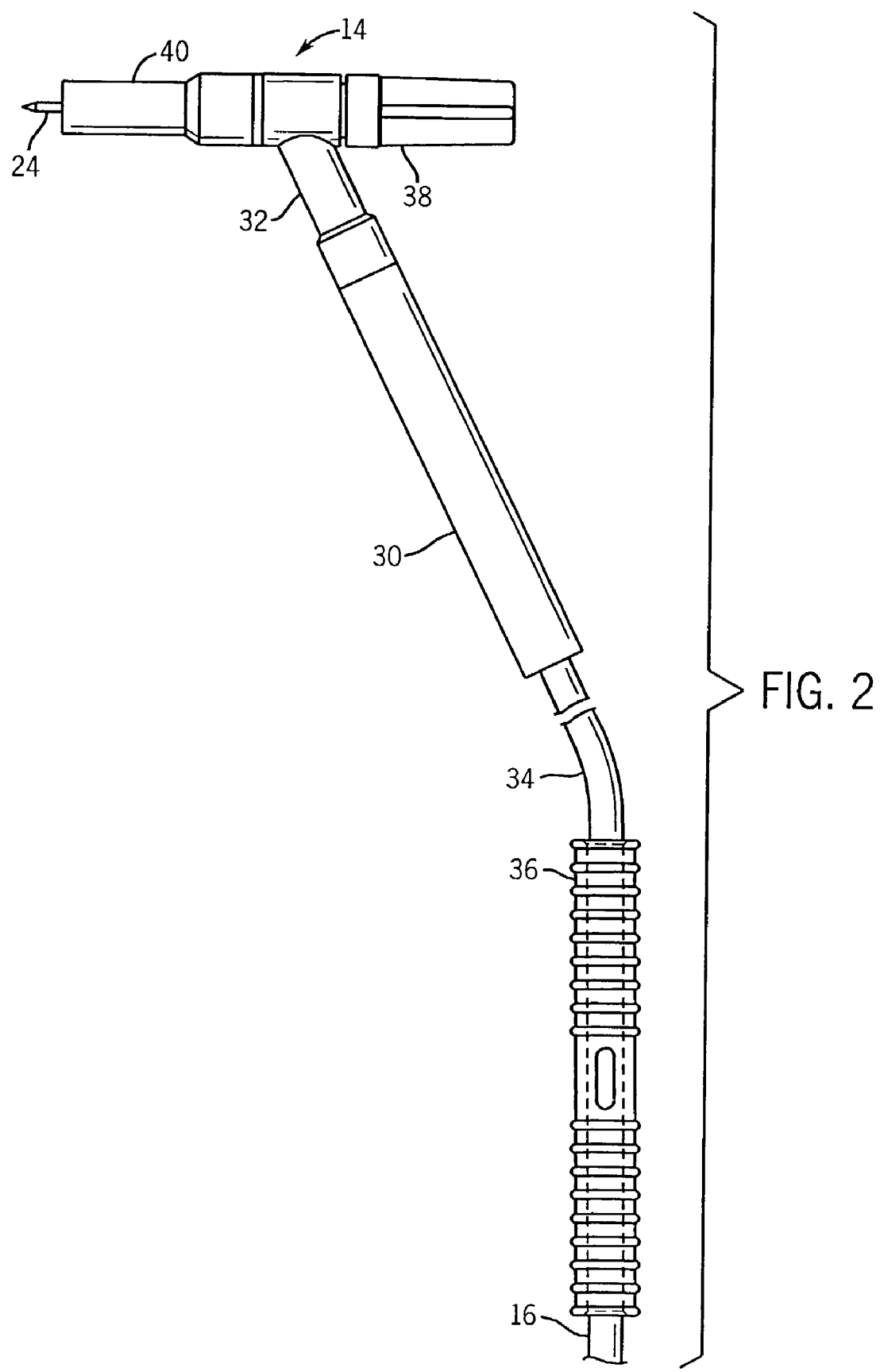
FIG. 2 is an elevational view of a TIG welding torch, according to an exemplary embodiment of the present technique.
Figure 3:
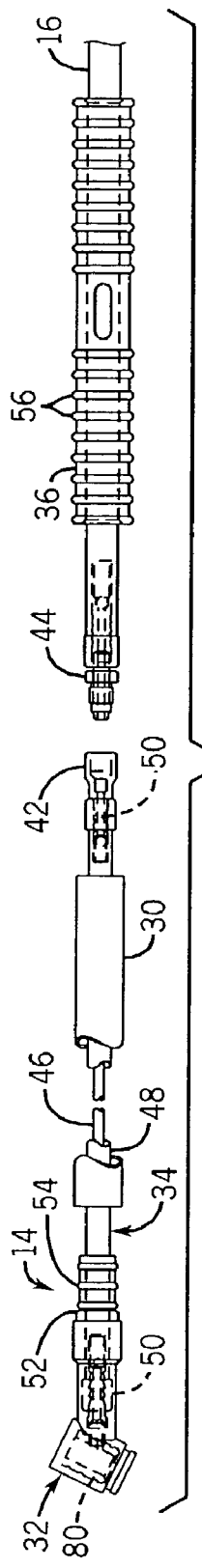
FIG. 3 is an exploded view of an air-cooled TIG welding torch, according to an exemplary embodiment of the present technique.

Referring generally to FIGS. 2 and 3, the welding torch 14 has a handle 30 that is adapted to be held by a user to direct the operation of the welding torch 14. The welding torch 14 is adapted so that the torch 14 may be operated with the handle on or off. The welding torch has a torch body 32. The torch body 32 is adapted to receive the electrode 24 and to direct the inert gas towards the target material 22. The handle 30 and torch body 32 are adapted to enable the handle 30 to be removed or secured to the torch body 32. In addition, in this embodiment, the torch body 32 is adapted so that no conductive metal portions are exposed when the handle 30 is removed from the torch body 32, thus preventing arcing and allowing operation of the welding torch 14 to continue after the handle 30 is removed. In the illustrated embodiment, the torch body 32 has an electrically insulated outer covering over the electrically conductive portions of the torch body 32 to prevent arcing.

In the illustrated embodiment, the torch 14 is adapted with a length of cable 34 that is coupleable to the welding cable 16 to convey gas and electricity from the welding cable 16 to the torch body 32. The torch cable 34 moves the electrical connectors used to electrically couple the welding torch 14 and the welding cable 16 away from the torch body 32. Thus, enabling the torch body 32 to be disposed in a more confined location without risk of electrical arcing. In the illustrated embodiment, the welding torch 14 also has an insulation boot 36 that is adapted to cover the connection between the torch cable 34 and the welding cable 16, preventing arcing from the electrical connectors used to couple the welding torch 14 and welding cable 16. However, heat shrink tubing may also be used to insulate the electrical connectors connecting the torch cable 34 and welding cable 16.

In this embodiment, the torch 14 also has a back cap 38 to seal the end of the torch body 32 opposite the electrode so that the gas does not leak out of the torch body 32. Various lengths of back caps may be used to enable the torch body to receive electrodes of various lengths. In addition, a nozzle 40 is secured to the front end of the welding torch 14 to direct gas toward the workpiece 22.

Figure 3A:
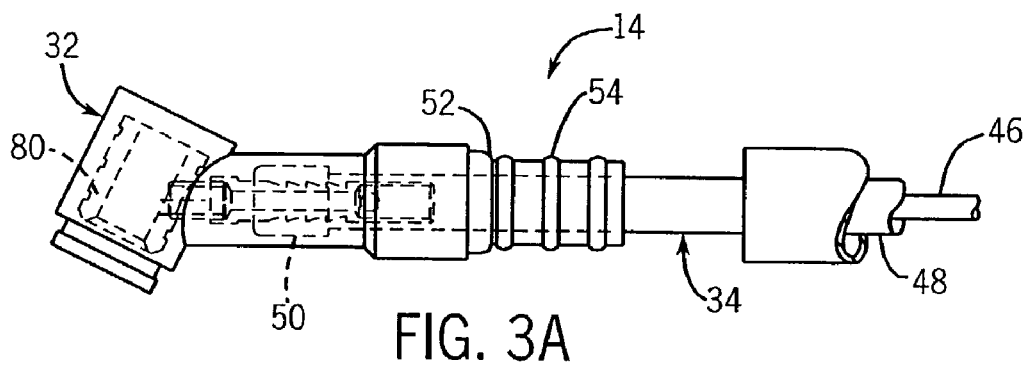
FIG. 3A is a detailed view of the torch body of the air-cooled TIG welding torch of FIG. 3.

Referring generally to FIGS. 2 and 3, an air-cooled TIG welding torch 14 is illustrated. The torch cable 34 has a first connector 42 that is adapted for connection to a second connector 44 disposed on the welding cable 16. The first and second connectors are adapted to convey gas and electricity. The torch cable 34 has a wire 46 disposed within a flexible hose 48. The wire 46 is adapted to convey electricity and the hose 48 is adapted to convey gas. The wire 46 and hose 48 are connected to a barbed connector 50 disposed within the first connector 42. The torch body 32 has a receiving portion 52 that is adapted to receive the wire 46 and the hose 48 of the torch cable 34. As best illustrated in FIG. 3A, the torch body 32 also has a barbed connector 50 located within the torch body 32. The wire 46 and hose 48 are connected to the barbed connector 50 disposed within the torch body 32. The receiving portion also is adapted with a plurality of ribs 54. The handle 30 is disposed over the plurality of ribs 54. The ribs 54 are adapted to produce friction between the interior of the handle 30 and the ribs 54 to secure the handle to the torch body 32. The boot 36 also is adapted with a plurality of ribs 56 to enable a user to grip the boot and slide the boot over the first and second connectors.

Figure 4:
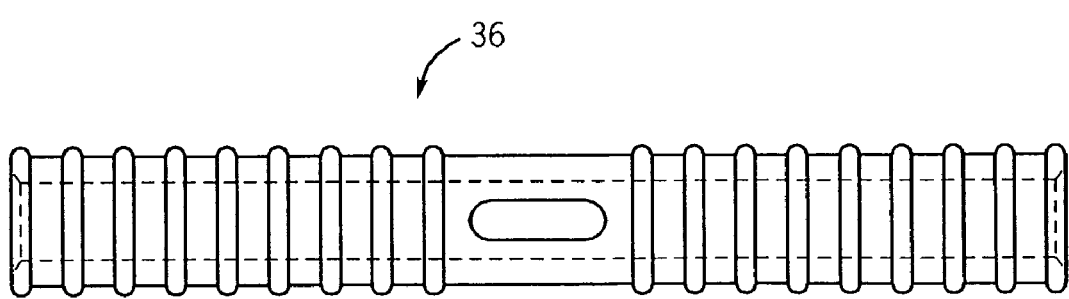
FIG. 4 is an elevational view of a rubber boot for covering a connection between a welding torch and a welding cable, according to an exemplary embodiment of the present technique.

As illustrated in FIGS. 3 and 4, the boot 36 is adapted with a plurality of ribs 56 on each end so that the boot 36 may be disposed over the torch cable 34 or welding cable 16 and then pulled toward the first and second connectors. Preferably, the boot 36 is formed of a molded material, such as silicone rubber. Friction produced between the boot 36 and the cables will secure the boot 36 in position.

Figure 5:
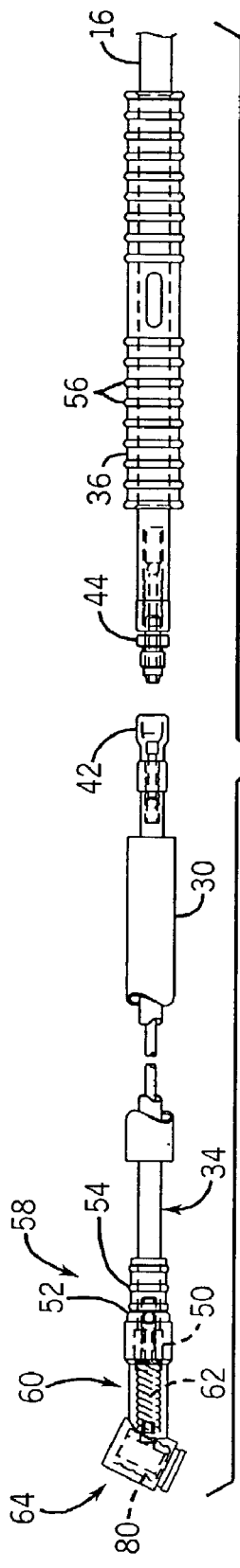
FIG. 5 is an exploded view of a flexible TIG welding torch, according to an exemplary embodiment of the present technique.
Figure 5A:
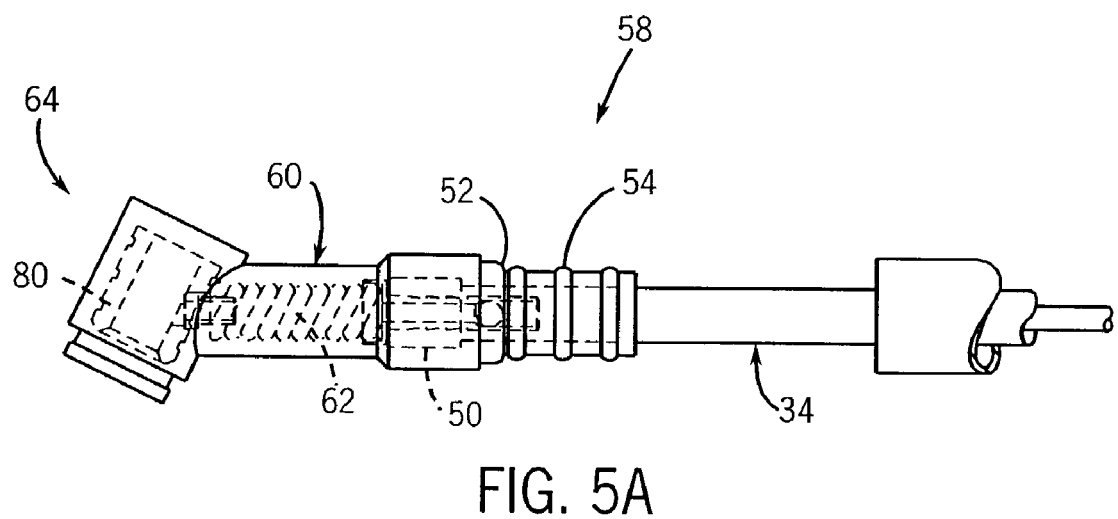
FIG. 5A is a detailed view of the torch body of the flexible TIG welding torch of FIG. 5.

Referring generally to FIGS. 5 and 5A, an alternative embodiment of a TIG welding torch 58 is illustrated. In this embodiment, the welding torch 58 has a torch body 60 that is adapted to be flexible. The torch body 60 has a coil 62 disposed between a barbed connector 50 and the body portion 64 of the torch body 60. The coil 62 enables the body portion 64 to be flexed relative to the receiving portion 52. In addition, the coil 62 is adapted to maintain the body portion 64 in the flexed position. The capability of flexing the torch body 60 enables a user to grip the handle and have the electrode oriented to their preference. In addition, flexing the torch body may enable a user to shape the torch body so that operation in a confined area is less confining.

Figure 6:
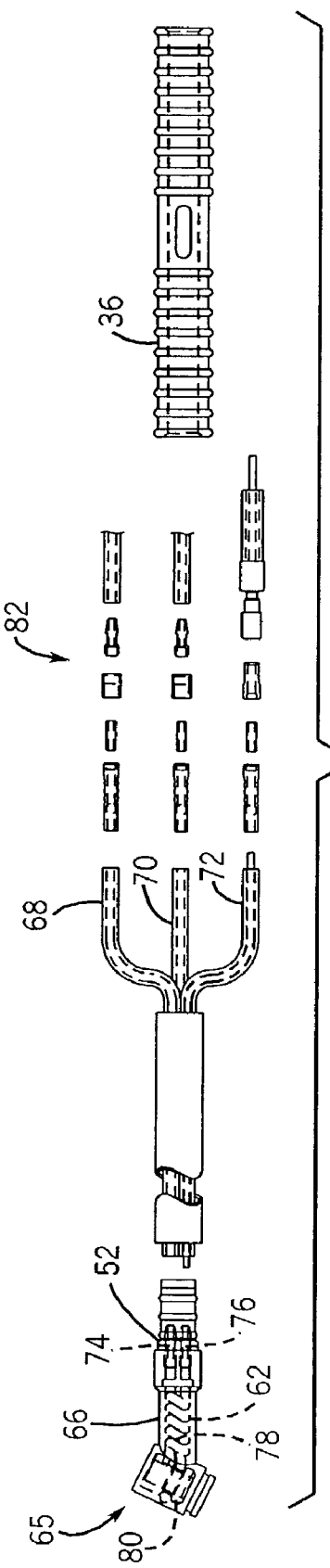
FIG. 6 is an exploded view of a flexible fluid-cooled TIG welding torch, according to an exemplary embodiment of the present technique.
Figure 6A:
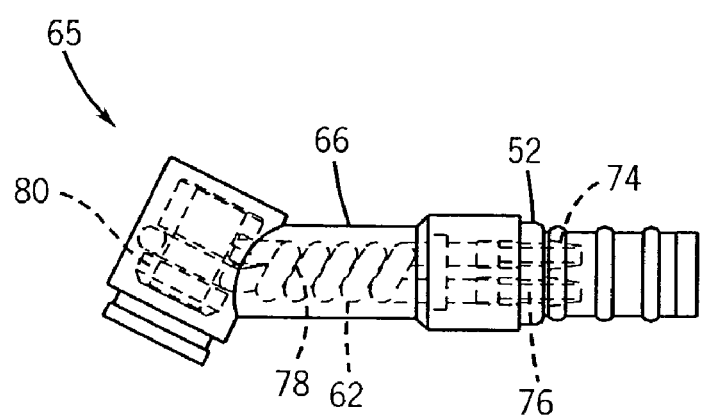
FIG. 6A is a detailed view of the torch body of the flexible fluid-cooled TIG welding torch of FIG. 6.

Referring generally to FIGS. 6 and 6A, a second alternative embodiment of a TIG welding torch 65 is illustrated. In this embodiment, the torch body 66 is adapted to be flexible and fluid-cooled. In this embodiment, there are three torch cables: a fluid supply line cable 68, a gas supply cable 70, and a fluid return/power cable 72. The torch body 66 has a fluid supply connector 74 and a fluid return connector 76 disposed therein. The fluid supply and return connectors coupled to a flexible coiled tube 78 that is routed around the torch head 80 disposed within the torch body 66. The coiled tube 78 also enables the torch body to be flexed relative to the receiving portion 52. The threaded torch head 80 is used to secure the electrode to the torch body 66 and to couple electricity to the electrode. In addition, gas is routed through the interior of the torch head 80. Various connectors 82 may be disposed on the three cables to couple the cables to respective cables of a welding cable adapted to convey cooling fluid to the welding torch 65. One or more boots 36 may be used to cover the connections between the three torch cables and the respective cables of the welding cable.

The techniques described above provide a TIG welding torch that may be operated with its handle on or off. Operation with the handle removed enables the torch to be operated in more confined areas. In addition, the torch is adapted so that there are no exposed metal parts that could arc to adjacent structures. The torch also has an installed cable that enables the electrical connection of the torch to the welding cable to be made a short distance away from the torch body 32, also to reduce arcing to adjacent structures. In addition, an insulating boot is provided to cover the connection of the torch to the welding cable. The weight of the welding torch also is reduced with the handle removed. Furthermore, the welding torch is compatible for use with existing welding cables.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A welding torch, comprising:
   an electrically insulated torch body having a torch head adapted to receive an electrode and to secure the electrode thereto; and
   an electrically insulated flexible cable having a flexible portion extending continuously from within the torch body to a location external to the torch body, the electrically insulated flexible cable being adapted to convey gas and electricity to the torch body.

2. The welding torch as recited in claim 1, wherein the torch body is adapted to receive the cable within the torch body.

3. The welding torch as recited in claim 2, wherein the torch body comprises a first electrical connector disposed within the torch body, the first electrical connector being adapted for connection to a second electrical connector disposed on the cable.

4. The welding torch as recited in claim 3, comprising an electrically insulating material disposed over the first and second electrical connectors.

5. The welding torch as recited in claim 3, wherein the torch body and cable are adapted so that the first and second electrical connectors are not exposed when a handle securable to the torch body is removed from the torch body.

6. The welding torch as recited in claim 5, wherein the cable is adapted for connection to a welding cable, the welding torch comprising an electrically insulating boot adapted to cover the connection between the cable and the welding cable.

7. The welding torch as recited in claim 6, wherein the welding cable is adapted to convey cooling fluid to and from the torch body independent of the gas.

8. The welding torch as recited in claim 1, wherein the torch body is flexible.

9. The welding torch as recited in claim 1, comprising a movable handle securable to the torch body.

10. The welding torch as recited in claim 9, wherein the movable handle is securable to the torch body by friction.

11. A torch body for a welding torch, comprising:
    a head adapted to secure an electrode to the welding torch;
    a connector adapted to connect the head to a flexible cable having a flexible and electrically insulated portion extending continuously externally with respect to the torch body and being operable to convey gas and electricity to the head; and
    an outer flexible covering comprising an electrically insulating material disposed over the connector to cover the connection between the cable and the head.

12. The torch body as recited in claim 11, comprising the cable operable to convey gas and electricity to the head, wherein the cable is connected to the connector.

13. The torch body as recited in claim 11, wherein the torch body and cable are adapted to convey cooling fluid to cool the head.

14. The torch body as recited in claim 11, wherein a portion of the outer covering is adapted to receive a removable handle, the portion of the outer covering being adapted to dispose the cable through the handle.

15. The torch body as recited in claim 14, wherein the outer covering is adapted to produce friction with the removable handle to secure the removable handle to the outer covering.

16. The torch body as recited in claim 11, wherein the torch body is flexible to enable the flexible portion to be flexed relative to the connector.

17. A TIG welding torch, comprising:
    a torch body having an electrical connector substantially disposed within the torch body;
    a flexible cable having a flexible portion extending continuously externally with respect to the torch body and being operable to convey gas and electricity connected to the electrical connector, the flexible portion comprising an electrical pathway surrounded by an insulating material; and
    a molded covering disposed over the electrical connector to electrically insulate the connector.

18. The welding torch as recited in claim 17, comprising a removable handle, wherein the electrical connector is not exposed when the handle is removed.

19. The welding torch as recited in claim 17, wherein the torch body comprises an end portion adapted to receive the electrical cable and the removable handle, the end portion comprising an electrically insulating material.

20. The welding torch as recited in claim 17, wherein the torch body is flexible.

21. The welding cable as recited in claim 20, wherein the torch body is liquid cooled.

22. A welding system, comprising:
    a power source;
    a first welding cable operable to convey electricity from the power source; and
    a torch body having a second welding cable integral thereto, the first and second welding cables being adapted for mating engagement, wherein the torch body is adapted with a flexible member to enable one end of the torch body to be flexed relative to an opposite end and wherein an electrically insulated portion of the second welding cable extends continuously from within the torch body to a location external to the torch body.

23. The welding system as recited in claim 22, comprising a removable handle securable to the torch body.

24. The welding system as recited in claim 22, wherein the torch body comprises an electrical connector disposed therein and an electrically insulating cover disposed around the electrical connector.

25. The welding system as recited in claim 22, comprising a fluid cooler, the first welding cable being coupleable to the fluid cooler, wherein the second welding cable and torch body are adapted to provide a flow of cooling fluid through the torch body.

26. The welding system as recited in claim 22, wherein the first and second welding cables are adapted to convey gas from a gas source.

27. A method of operating a TIG welding torch, comprising:
    removing a handle secured to a first insulated portion of a torch body of the TIG welding torch; and
    gripping the first insulated portion of the torch body to operate the TIG welding torch after the handle is removed.

28. The method as recited in claim 27, comprising flexing the torch body to reposition a second insulated portion of the torch body adapted to receive an electrode relative to the first insulated portion.

29. The method as recited in claim 27, comprising connecting a first welding cable affixed to the torch body to a second welding cable coupleable to a power source.

30. The method as recited in claim 27, comprising coupling a fluid cooling cable to the torch body.

31. A method of assembling a welding torch, comprising:
connecting a first welding cable connector of a welding cable coupleable to a welding power source to a second welding cable connector of a flexible welding cable having a flexible and electrically insulated portion extending continuously from a torch body of the welding torch to a point externally located with respect to the torch body;
securing a movable handle to the torch body; and
disposing an electrically insulating boot over the first welding cable connector and the second welding cable connector.

32. The method as recited in claim 31, comprising disposing the welding cable extending from a torch head of the welding torch through the handle.

33. The method as recited in claim 31, comprising disposing a flexible member within the torch head to enable the torch head to be flexed.

34. A welding torch for deployment of a welding electrode during a welding process, the welding torch comprising:
a first coupling mechanism substantially disposed within an interior region of a torch body and configured to direct electrical current and gas toward the welding electrode;
a first welding cable being configured to route electrical current and gas therethrough and having a second coupling mechanism configured to engage with the first coupling mechanism at a location within the interior region, the first welding cable having both a flexible portion and a third coupling mechanism located outside the interior region of the torch body; and
a handle assembly releasably securable to the torch body;
wherein the welding torch is configured for user operation with the handle assembly in a released position with respect to the torch body.

35. The welding torch as recited in claim 34, wherein the flexible portion comprises an electrical pathway surrounded by an electrically insulative material.

* * * * *